INVENTORS
TARO NAGASAWA
SHIGEO OKONOGI
SABURO OIZUMI
TATSUMI OHYA

ATTORNEY

United States Patent Office 3,761,285
Patented Sept. 25, 1973

3,761,285
CANNED CARBONATED SHERBET MIX
Taro Nagasawa, Shigeo Okonogi, Saburo Oizumi, and Tatsumi Ohya, Tokyo, Japan, assignors to Morinaga Milk Industry Co., Ltd., Tokyo, Japan
Continuation-in-part of abandoned application Ser. No. 855,031, Sept. 3, 1969. This application July 30, 1971, Ser. No. 167,579
Claims priority, application Japan, Feb. 14, 1969, 44/10,496
Int. Cl. A23g 5/00
U.S. Cl. 99—137
11 Claims

ABSTRACT OF THE DISCLOSURE

A carbonated sherbet mix which is canned at a specific ratio of sherbet mixture solids and liquid with propellant gas within critical proportions and under a critical pressure correlated with the amount of the constituents as well as with the volume of the can and within critical temperature limits to produce after freezing the effect of forcing the frozen sherbet dramatically and slowly out of the can in a monolithic self-supporting structure ready for immediate consumption.

CROSS REFERENCES TO RELATED APPLICATIONS

This is a continuation-in-part to U.S. patent application Ser. No. 855,031, filed Sept. 3, 1969, now abandoned, entitled to the priority date of Japanese application No. 10,496/1969, filed Feb. 14, 1969, and priorities thereof are claimed for this case.

BACKGROUND OF THE INVENTION

Field of the invention

The present invention relates to a canned carbonated sherbet mix package which when cooled to about —10 to —25° C. on opening produces a carbonated sherbet having an improved taste and a foamy structure of fine ice and to the process of manufacturing thereof.

DESCRIPTION OF THE PRIOR ART

The prior art is represented by U.S. Pats. Nos.: 1,548,430 of Aug. 4, 1925, to F. M. Ashley; 2,290,214 of July 1942, to Smith; and French No. 1,539,120 of August 1968, to Weinstein. Some of these references broadly teach the employment of a propellant gas in the sherbet of undefined proportions, pressures and temperatures for the sole purpose of expelling the sherbet in an amorphous heap as an intermediate step to a subsequent processing or serving thereof.

SUMMARY OF THE INVENTION

Contrary to the prior art the present invention teaches the canning of a specific amount of sherbet with carbon dioxide at a specific ratio of pressure and at a strictly calculated temperature to provide a novel combination of a sherbet mix canned package and serving container, similar, for instance, to a conventional carbonated beverage can, which on opening, while frozen to the temperature of a refrigerator, extrudes the sherbet in a monolithic foamy structure of sherbet with a carbonated flavor.

The objects of the invention are:

To provide sherbet in a can which serves not only as the container for preparing the sherbet, but simultaneously also as its package and finally on opening also as a handy self-dispensing serving and holding container. Thus the sherbet may be consumed immediately on opening the can, directly therefrom, without a tray, avoiding the necessity of contact by the consumer with the sherbet by hand or spoon;

To provide a canned carbonated soft dessert mix package in which a frozen dessert, such as sherbet, can be readily served simply by freezing the package in a conventional freezer at home, in an ice cream parlor, in a restaurant, in an ice cream wagon selling ice cream to children on the street and particularly in a refrigerated can vending machine;

To provide a carbonated sherbet mix of 10 to 20%, by weight, of the total solid content and containing 0.10 to 0.25%, by weight, of a stabilizer, carbon dioxide dissolved therein at an inner pressure of the resulting carbonated sherbet mix of 1.3 to 2.3 kg./cm.$^2$ (gauge pressure) at 15° C., in a valveless and flat-top hermetically sealed can;

To provide a canned carbonated sherbet mix of the type described, which when frozen at —10 to —25° C. and subsequently opened at room temperature, because of the reduction of pressure, causes the sherbet with the carbon dioxide to expand and vaporize and to extrude slowly from the can as the carbonated sherbet in a column of a foamy structure of fine sherbet ice crystals with a carbonic acid flavor imparted to it;

To provide the optimum composition of the sherbet mix, and the optimum conditions for preparation of the package, including the pressure of the carbon dioxide, the freezing temperature and the shape of the can, so the canned carbonated sherbet mix package fulfills the requirements of the consumers;

To provide a container, suitable for the purpose, also equipped with means of access to the residue of the sherbet, which remains in the container after the portion thereof, extruded from the container is consumed or otherwise removed;

To provide alternative embodiments for such containers, and means of access to their interiors, which are also suitable for mass distribution, such as in refrigerated vending machines; and To provide a process for preparing such a package.

DESCRIPTION OF THE PREFERRED EMBODIMENTS

Figure 1:
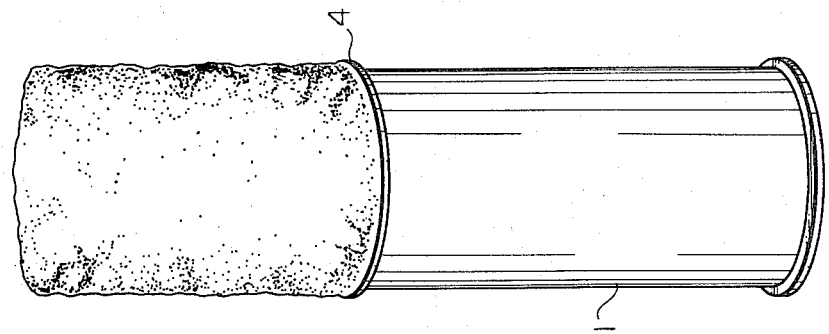
FIG. 1 is a perspective view of a can for a frozen pressurized carbonated sherbet mix package of the present invention.
Figure 2:
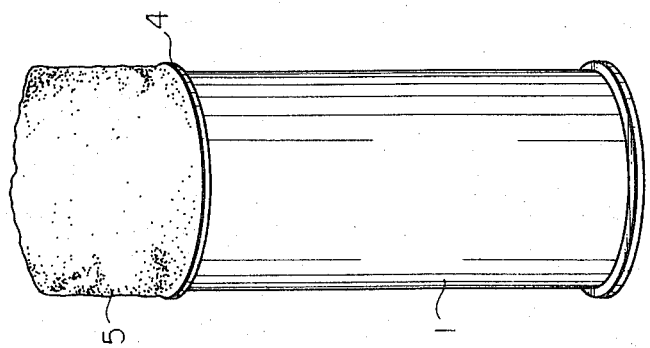
FIG. 2 is a perspective view showing an intermediate stage of sherbet rising from the can at the time of 4 to 6 seconds after opening.
Figure 3:
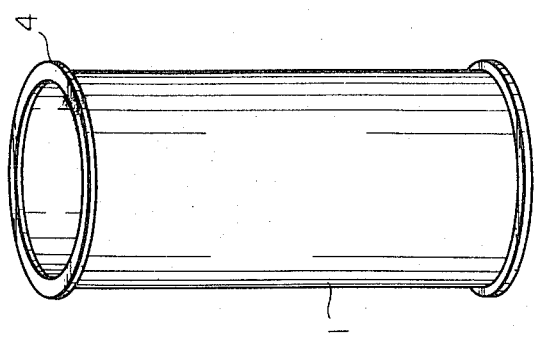
FIG. 3 is a perspective view same as in FIG. 2 showing the rise of the sherbet after approximately 10 seconds from the opening of the can.

A sherbet mix is prepared from conventional sherbet-making solids and liquids of about 10% to 20% of solids by weight and a stabilizer added of 0.1–0.25% by weight. The mix is pasteurized, charged with carbon dioxide at 1.3 to 2.3 kg./cm.$^2$ (gauge pressure) at 15° C., canned in a can having specific properties and hermetically sealed. When the can while frozen to between —10 to —25° C., is opened under ambient conditions, the frozen carbonated sherbet expands due to the diffusion of the carbon dioxide to about 1.6 to 1.8 times the volume of the mix and the excess sherbet is forced out, slowly extruding spectacularly through the opening in a monolithic solid but soft and foamy column of fine carbonated sherbet crystals.

The sherbet mix conventionally contains sugars such as cane sugar, glucose, etc. as main ingredients and optionally contains organic acids such as citric acid, malic acid, etc., fruit juices such as orange juice, strawberry juice, etc., dairy products such as milk, condensed milk, skim milk, etc., artificial sweetener and flavors, also flavorings such as coffee, cocoa, etc. and extracts from medicinal herbs such as comfrey (Borraginaceae) and kuko (*Lycium chinense* Mill).

The ratio of solids in the mix of 10–20% by weight is critical. Since the total solid content is substantially dependent on that of sugar which is the main ingredient of the mix, it is necessary to substantially limit the sugar content to the above ratio. If the total solid content is in excess of 20%, the solubility of the carbon dioxide decreases, and the expansibility of the sherbet decreases. The sherbet does not freeze homogeneously, because the concentration of the solid content in the unfrozen part becomes too high and thus frozen and unfrozen portions are formed in the can which make the rising column of the sherbet ill formed and low in overrun. If the total solid content is less than 10%, the ice crystals are ill-formed, and it becomes difficult to produce a foamy structure.

The sherbet mix for purposes of this invention defines a mixture of raw materials for a frozen dessert such as sherbet and water ice, containing sugars as a main ingredient with fruit juices, organic acids, liquid dairy products, flavorings and extracts from medicinal herbs and a stabilizer.

The stabilizer is selected from a group consisting of carboxyl methyl cellulose, methyl cellulose, sodium polyacrylate, propylene glycol alginate, gum, gelatin, agar-agar, pectine, and equivalents. In order to vary the sherbet flavor, 2 to 3%, by weight of the mix, skim milk may be added thereto.

The stabilizer causes the frozen sherbet to rise slowly from the opened can when it is treated in accordance with the invention as described hereinafter.

The carbon dioxide is dissolved in the sherbet mix under pressure at low temperatures because it is advantageous for dissolution of the carbon dioxide and also necessary to hermetically seal the can subsequently. As the soluble gas propellant for breaking the structure of ice crystals, pure gas of carbon dioxide is utilized. Besides having the function of a propellant, the carbon dioxide gives to the sherbet a carbonic acid flavor. Carbon dioxide is introduced and dissolved into the sherbet mix under pressure from a carbon dioxide cylinder, a liquid carbonic acid reservoir or a commonly used carbonator.

Next, the mix with the stabilizer optionally is homogenized, pasteurized and cooled according to the conventional method.

The cooled mix, with the carbon dioxide dissolved therein, subsequently is canned and the can is hermetically sealed in the cooled state. The can is optionally pasteurized. Thus, the desired canned sherbet mix package is obtained.

The canned sherbet mix is frozen as it is pressurized for use. In order to provide the soft, carbonated sherbet of smooth texture slowly coming up in the form of a column from the can, the mix in the process of freezing must be once super-cooled (below its freezing point without solidification) prior to its solidification to result, after solidification, in a sherbet with discrete fine ice crystals which form a discontinuous phase to facilitate the diffusion of the liberated carbon dioxide gas throughout its content.

It is therefore important that the mix be capable of being super-cooled so that it maintains a discontinuous structure of ice crystals. The use of the stabilizer aids in imparting the above-described property and structure to the mix. The mix itself provides a sherbet having a fine structure of ice crystals and an excellent edible taste, the stabilizer causes its rising slowly in the form of the column.

When the amount of the dissolved carbon dioxide is too small, only a small volume of a foamy structure is produced and the sherbet does not rise. Therefore, the volume of foam produced varies with the pressure the carbon dioxide develops, and the pressure of 1.3 to 2.3 kg./cm.$^2$ at 15° C. is critical. This pressure is lower in comparison with that of aerosol product, but is sufficient to push the sherbet out, because the inner pressure of the can rises to 6 to 7 kg./cm.$^2$ after it has been completely frozen. If the total solid content of the mix becomes higher, the amount of the carbon dioxide dissolved is reduced. Therefore, the pressure of the carbon dioxide must be increased and in turn a can holding a higher pressure is required. Therefore, it is not economical to elevate the total solid content.

While the maximum total solid content of 20% and the maximum pressure of 2.3 kg./cm.$^2$ at 15° C. are sufficient for practical purposes, the simultaneous increases in the ratios of solid contents and pressures, however, come within the scope of this invention.

The amount of the carbon dioxide required for the formation of the foamy structure is shown in the following Table 1, together with the volume amount obtained.

Table 1 shows the relationship of pressure of carbon dioxide filled up at 15° C., the expanded volume, texture and overrun when a canned carbonated sherbet mix package is frozen and opened as it is frozen, which is obtained by introducing carbon dioxide into a solution of 15% of sugar, 3% of skim milk solid content, 0.25% of acid resistant CMC as a stabilizer and 0.26% citric acid under different pressures, filling up 250 cc. of the resulting solution in an ordinary can for carbonic beverage (capacity 267 cc.) and hermetically sealing it.

The term "overrun" means a value calculated from the expanded volume and the volume of residue in the can according to the following formula:

$$\text{Overrun (percent)} = \frac{[\text{Volume of expanded material} + \text{volume of residue} - 250]}{250} \times 100$$

TABLE 1

| Pressure of dissolved CO$_2$ at 15° C., kg./cm.$^2$ | After opening the can at 20° C. | | | |
|---|---|---|---|---|
| | Volume of sherbet discharged, cc. | Volume of sherbet remained, cc. | State of structure | Overrun, percent |
| Storaged at −10° C.: | | | | |
| 0.8 | 50 | 250 | Slightly hardened | 20 |
| 1.3 | 150 | 250 | Soft snowlike | 60 |
| 1.8 | 200 | 225 | do | 70 |
| 2.3 | 220 | 205 | do | 70 |
| Storaged at −15° C.: | | | | |
| 0.8 | 20 | 250 | Hardened | 8 |
| 1.3 | 160 | 240 | Soft snowlike | 60 |
| 1.8 | 240 | 185 | do | 70 |
| 2.3 | 280 | 170 | do | 80 |
| Storaged at −20° C.: | | | | |
| 0.8 | 10 | 250 | Hardened | 4 |
| 1.3 | 150 | 250 | Soft snowlike | 60 |
| 1.8 | 180 | 235 | do | 65 |
| 2.3 | 210 | 215 | do | 70 |

It is apparent from Table 1 that the pressure of the carbon dioxide between 1.3 and 2.3 kg./cm.$^2$ at 15° C. results in the optimum expansion of the sherbet to 1.6 to 1.8 times the volume of the mix. The canned carbonated sherbet mix package is to be kept stored in a deep-freezer completely frozen at a temperature preferably between −10° and −25° C. When freezing the can to less than −10° C., the production rate of ice is lower and the desired rigid column of carbonated sherbet rises from the can with difficulty. When freezing the can in excess of −25° C., a good structure of the sherbet cannot be obtained because of lack of super cooling and formation of a large-size plate of ice crystal.

EXAMPLE 1

10 kg. of evaporated skim milk, 10 kg. of cane sugar, 0.22 kg. of citric acid, 0.23 kg. of stabilizer (acid resistant CMC), and 0.26 kg. of flavoring were combined and dissolved in 79.29 kg. of water. The mixture was homogenized at 150 kg./cm.$^2$, pasteurized at 85° C. for 15 sec. After cooling, carbon dioxide was injected into and dissolved in the liquid under a pressure of 0.7 kg./cm.$^2$ at 5° C. which is equivalent to 1.4 kg./cm.$^2$ at 15° C., and 250 cc. of the resulting carbonated sherbet mix were filled up in a pressure can (contents 267 cc.) and hermetically sealed. The contents were pasteurized in situ at 85° C. for 15 minutes. The product was placed in the freezing compartment of a home refrigerator (ca. −15° C.) overnight. When the container was opened, the contents, foamed by the escaping carbon dioxide, expanded and were propelled out at high pressure. The amount spilled was 150 cc. and the total volume was expanded by 1.6 times the original volume under ambient condition. Thus, a carbonated sherbet having a snowy structure of fine ice crystals and carbonic acid flavor was obtained.

EXAMPLE 2

12 kg. of cane sugar, 30 kg. of straight fruit juice of orange, 0.25 kg. of stabilizer (acid resistant CMC), and 0.25 kg. of flavoring were combined and dissolved in 57.5 kg. of water. The mixture was pasteurized at 85° C. for 15 sec. After cooling, carbon dioxide was injected into and dissolved in the liquid under a pressure of 0.8 kg./cm.$^2$ at 6.5° C. and 250 cc. of the resulting carbonated sherbet mix were filled up in a pressure can (contents 267 cc.) and hermetically sealed. The thus prepared carbonated sherbet liquid was pasteurized in situ. The product was frozen in the freezing compartment of a home refrigerator (ca. −15° C.) overnight. When the can was opened under ambient condition, the sherbet was expanded by the released carbon dioxide as a propellant to a volume 1.8 times that of the original liquid mixture. Thus a frozen dessert of homogeneous cool fine ice crystals with a harmonized flavor of fruit juice and carbonic acid was obtained.

Contrary to the prior art dispensers employing propellants, the can useful for the canning of the product of the present invention, preferably is valveless with a wide top permitting opening thereof, leaving a wide orifice. The size and the shape of the orifice determines the diameter and the shape of the sherbet extruded therefrom.

The can for canning the sherbets of the compositions and under the pressures described above must be capable of holding an internal pressure of at least 6.5 kg. per square cm. This also applies to any opening seams with which the can may be provided. However, as already said, the composition and the pressure at which the sherbet is canned may be varied at the same ratios to higher or lower contents and pressures, thus also affecting the requirement for the capability of the can to hold the internal pressure.

Since only a portion of the sherbet rises from the can above its open orifice, normally between 60 and 80% of its total volume, means are provided in connection with the can to permit a quick and easy removal of the remainder of the sherbet left in the can.

Examples of such cans are illustrated in FIGS. 1 to 6 of the accompanying drawings.

A can of FIG. 1 has lid 1. It may be opened by a can opener. Since, however, the conventional carbonated beverages vending machines do not have can openers available, which would expose the total top of the can, in order to make the present invention available for vending machine distribution, specific lid opening means are provided.

Figure 5:
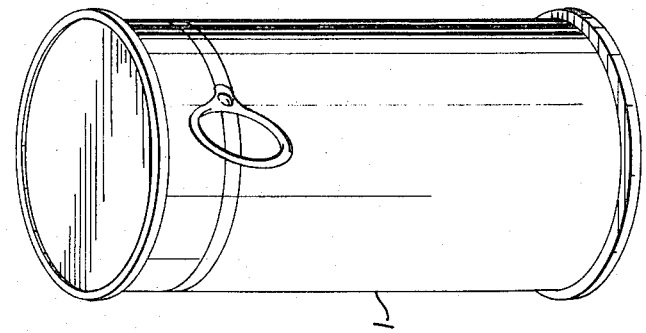
FIG. 5 shows the can with a ring handle and a circumferential precreased ribbon to remove the lid and the top portion of the can.
Figure 4:
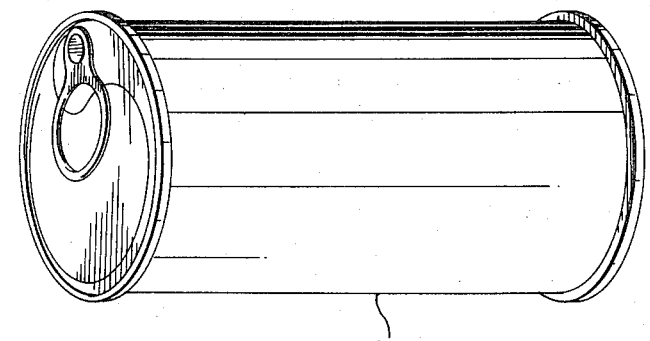
FIG. 4 shows the can with a lid, removable with a ring handle and precreased to a circular ribbon.
Figure 7:
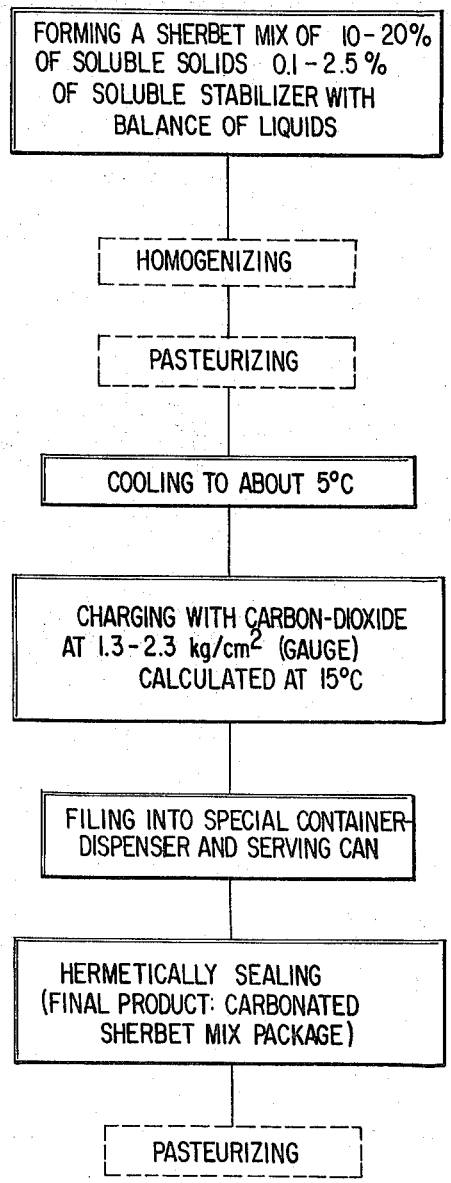
FIG. 7 is a flow diagram of the process of the invention, showing the essential steps in solid frames and the optional steps in dotted frames.

Thus, vending machine distribution is available as illustrated in FIGS. 4 and 5. The lid may be applied to the can conventionally by soldering, swaging, rolling as shown also in FIGS. 4 and 5.

Figure 6:
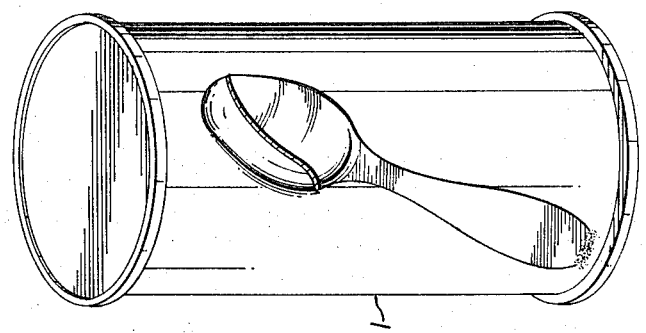
FIG. 6 shows the sherbet can with a disposable spoon attached on the outside of the can.

The lid may be either removed by any of the means illustrated in FIGS. 1 to 5, and the spoon shown in FIG. 6 may be employed.

Instead of the pull handle shown, a rotatable key, such as employed in opening sardine cans may be used, and in such an instance, instead of the pull handle, a tongue projects from the precreased helix. Thereafter, the tongue is pulled, and the ribbon is beginning to separate the lid from the remainder of the wall giving access to the unextruded sherbet.

The material from which the can is made must be inert to the sherbet and to the carbon dioxide and may be such as tinned sheet metal, aluminum, an aluminum alloy, an inert plastic conventionally used for food containers, and any container including cardboard with an inner inert lining. A critical requirement is the property of the container to withstand the inner pressure, which the sherbet develops on freezing, as stated.

The same requirement applies also for the joints between lid and rim and the precreasing lines of the can, shown in FIGS. 4 and 5.

In order to permit access to the sherbet in the interior of the can, which will not extrude above the upper rim, an outwardly connected paddle or spoon 7 is illustrated on FIG. 6, attached to the can by a strap 8. The spoon, however, may be attached to the can integrally by soldering, such as it is accomplished on tin can sardines with keys.

The combination of a sardine key-type spoon, for instance, wrapped around the can and/or over the lid thereof with a precreased helix comes within the scope of the invention.

What is claimed is:

1. A canned pressurized carbonated sherbet mix comprising:

a sherbet mix including a stabilizer at about 0.10% to 0.25% by weight, homogenized soluble and edible solids dissolved with edible fluids at a ratio of about 10% to 20% by weight of said solids to the balance of said liquids;

pressurized with carbon dioxide to between about 1.3 to 2.3 kg./cm.$^2$ (gauge pressure) at 15° C. in a can having an internal pressure resistance between about 6 and 7 kg./cm.$^2$ (gauge pressure) at −25° C., whereby upon freezing said sealed can to a temperature between about −10° C. and −25° C., and opening, the sherbet expands and rises from said can to about 1.6 to 1.8 times the volume of said mix into an extruded stable, soft and snowy monolithic structure of foamy sherbet ice crystals with carbonic acid flavor, ready for immediate consumption, with the opened can functioning as the sherbet holder.

2. A canned pressurized carbonated sherbet mix as claimed in claim 1, said solids comprising a stabilizer at 0.10 to 0.25% by weight of sherbet mix selected from a group consisting of: carboxy methyl cellulose, methyl cellulose, sodium salt of polyacrylic acid, propylene glycol alginate, gums, gelatin, agar and pectin.

3. A canned pressurized carbonated sherbet mix as claimed in claim 1, said mix comprising materials selected from a group consisting of:

sugars, organic acids, milk, condensed milk, milk powder, skim milk, whey powder, fruit juices, flavorings, artificial sweeteners, extracts from medicinal herbs, glycerol, alcohol, carboxy methylcellulose (CMC), methyl-cellulose, sodium salt of polyacrylic acid, propylene glycol alginate, gums, gelatin, agar and water.

4. A canned pressurized carbonated liquid sherbet mix as claimed in claim 1, comprising:

said solids mixed with said fluids at a ratio of 10 kg. of evaporated skim milk, 10 kg. of sugar, 0.22 kg. of citric acid, 0.23 kg. of acid resistant CMC as the stabilizer, and 0.26 kg. of flavoring dissolved in 79.29 kg. of water, said carbon dioxide in said mix having a pressure of 0.7 kg./cm.$^2$ (gauge pressure) at 5° C.

said can charged with said mix at a ratio of 267 cc. of can volume to about 250 cc. of said mix, and at a pressure of 1.3 to 2.3 kg./cm.$^2$ (gauge pressure) calculated at 15° C.

5. A canned pressurized carbonated liquid sherbet mix as claimed in claim 1, said mix of solids consisting of 12 kg. of cane sugar, 30 kg. of fruit juice, 0.25 kg. of acid resistant CMC as the stabilizer, and 0.25 kg. of flavoring dissolved in 57.5 kg. of water, said carbon dioxide in said mix having a pressure of about 0.8 kg./cm.$^2$ (gauge pressure) at 6.5° C., said can charged with said mix at a ratio of 267 cc. of can volume to about 250 cc. of said mix.

6. A canned pressurized carbonated sherbet mix as claimed in claim 1, wherein said sherbet mix is pasteurized.

7. A canned pressurized carbonated sherbet mix as claimed in claim 1, wherein said can has means to facilitate the opening of the top thereof.

8. A canned pressurized carbonated sherbet mix as claimed in claim 1, said can having a precreased weakened circumferential line with manual means integral with said can to remove the top thereof to provide access to the interior of said can.

9. A canned pressurized carbonated sherbet mix as claimed in claim 1, further including a spoon attached to the can.

10. A canned pressurized carbonated sherbet mix as claimed in claim 1, wherein said mix is frozen.

11. A process of manufacturing a canned pressurized sherbet mix package for producing a carbonated sherbet having a rigid foamy structure of fine ice crystals and carbonic acid flavor which rises slowly as a column from said can, with 1.6 to 1.8 times the volume of the original liquid sherbet mixture, due to the expansion and diffusion of carbon dioxide dissolved therein, when said can is frozen and opened under ambient conditions, comprising the steps of:

(1) making a sherbet mix of 10 to 20%, by weight, in total solid content, with 0.10 to 0.25%, by weight, of stabilizer;

(2) dissolving said mix in a potable liquid;

(3) cooling said mixture;

(4) dissolving carbon dioxide in said mixture under a pressure of 1.3 to 2.3 kg./cm.$^2$ (gauge pressure) at 15° C.;

(5) filling said carbonated sherbet mix under said pressure into said can;

(6) said can having an internal pressure resistance of between about 6 and 7 kg./cm.$^2$ at −25° C.;

(7) hermetically sealing said can.

References Cited

UNITED STATES PATENTS

| 1,548,430 | 8/1925 | Ashley | 99—136 |
|---|---|---|---|
| 2,290,214 | 7/1942 | Smith | 99—136 |

FOREIGN PATENTS 1,539,120    8/1968    France.

ALVIN E. TANENHOLTZ, Primary Examiner

J. M. HUNTER, Assistant Examiner

U.S. Cl. X.R.

99—136, 192